United States Patent
Huang et al.

(10) Patent No.: US 11,455,001 B2
(45) Date of Patent: Sep. 27, 2022

(54) KEYBOARD DEVICE AND PALM REST MODULE THEREOF

(71) Applicant: Primax Electronics Ltd., Taipei (TW)

(72) Inventors: Shu-An Huang, Taipei (TW); Chun-Lin Chu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 133 days.

(21) Appl. No.: 16/579,688

(22) Filed: Sep. 23, 2019

(65) Prior Publication Data
US 2020/0363831 A1 Nov. 19, 2020

(30) Foreign Application Priority Data

May 17, 2019 (TW) .................. 108117164

(51) Int. Cl.
*G05G 1/58* (2008.04)
*G06F 3/023* (2006.01)

(52) U.S. Cl.
CPC .............. *G05G 1/58* (2013.01); *G06F 3/023* (2013.01)

(58) Field of Classification Search
CPC .... G05G 1/58; G05G 1/62; A47B 2200/0091; A47B 21/0371
USPC .......... 248/118.1, 118, 118.3, 118.5, 292.12, 248/279.1, 285.1, 286.1, 287.1
See application file for complete search history.

(56) References Cited

U.S. PATENT DOCUMENTS

| | | | | |
|---|---|---|---|---|
| 607,675 A * | 7/1898 | Barr | ................... | A47B 21/0371 248/118.1 |
| 5,281,001 A * | 1/1994 | Bergsten | .................. | A47C 1/03 297/411.24 |
| 5,348,408 A * | 9/1994 | Gelardi | .............. | A47B 21/0371 400/715 |
| 5,752,683 A * | 5/1998 | Novis | ...................... | A47C 1/03 248/118 |
| 5,826,842 A * | 10/1998 | Paulse | ................ | A47B 21/0371 248/118.1 |
| 5,915,655 A * | 6/1999 | Gutowski | .......... | A47B 21/0371 248/118.5 |
| 6,070,838 A * | 6/2000 | Luginsland | ........ | A47B 21/0371 248/118.5 |

(Continued)

FOREIGN PATENT DOCUMENTS

KR      2000034094 A   *   6/2000

*Primary Examiner* — Kimberly T Wood
(74) *Attorney, Agent, or Firm* — Kirton McConkie; Evan R. Witt

(57) ABSTRACT

A keyboard device includes a keyboard module and a palm rest module. The palm rest module is arranged beside a lateral side of the keyboard module, and supports a wrist of a user. The palm rest module includes a pedestal, a casing and an adjusting element. The casing is disposed on the pedestal. The adjusting element is arranged between the pedestal and the casing. A position of the casing relative to the pedestal is adjustable through the adjusting element. In a first usage state, the casing is moved toward the keyboard module or moved away from the keyboard module through the adjusting element. In a second usage state, the casing is rotated about the adjusting element and relative to the keyboard module, so that an included angle is formed between the casing and the lateral side of the keyboard module.

16 Claims, 7 Drawing Sheets

(56) References Cited

U.S. PATENT DOCUMENTS

| | | | | |
|---|---|---|---|---|
| 6,129,318 A | * | 10/2000 | Paulse | A47B 21/0371 |
| | | | | 248/118.3 |
| 6,142,570 A | * | 11/2000 | Bergsten | A47B 21/0371 |
| | | | | 297/411.35 |
| 7,699,275 B2 | * | 4/2010 | Jang | F16M 11/18 |
| | | | | 248/125.7 |
| 2002/0117589 A1 | * | 8/2002 | Ruan | A47B 21/0371 |
| | | | | 248/118.5 |
| 2005/0145758 A1 | * | 7/2005 | Chang | A47B 21/0371 |
| | | | | 248/118.1 |

\* cited by examiner

KEYBOARD DEVICE AND PALM REST MODULE THEREOF

FIELD OF THE INVENTION

The present invention relates to a keyboard device, and more particularly to a keyboard device with a palm rest module.

BACKGROUND OF THE INVENTION

When a computer is operated by the user, a keyboard device is used. The keyboard device is usually placed on a desk surface or a flat surface. Since the keyboard device has its inherent height, the user's wrist needs to be raised. That is, the user's wrist is in a suspended state. If the user's wrist is kept in the suspended state for a long term, the muscle tension problem of the wrist and arm occurs and the user feels unwell. For overcoming this drawback, a keyboard device with a palm rest has been introduced into the market. The palm rest is integrally extended from a front side of the keyboard device. When the user's wrist is placed on the palm rest, the comfort of operating the keyboard device is enhanced. Consequently, the unwell feel of the user's wrist and arm will be reduced.

However, the commercially available keyboard device with the palm rest still has some drawbacks. For example, the palm rest is fixed. That is, the position of the palm rest cannot be changed by the user. Since the shapes of the palms of different users are not always identical, the fixed type palm rest is not feasible to some users. Since the position of the fixed type palm rest is not adjustable, the unwell feel of the users' wrists and arms cannot be alleviated through the use of the palm rest.

Therefore, there is a need of providing an improved palm rest in order to overcome the above drawbacks.

SUMMARY OF THE INVENTION

The present invention provides a keyboard device with a keyboard module and a palm rest module. The palm rest module is movable or rotatable relative to the keyboard module.

The present invention provides a palm rest module. The palm rest module is movable to a desired position or rotatable to a desired angle according to the user's requirements.

The other objects and advantages of the present invention will be understood from the disclosed technical features.

In accordance with an aspect of the present invention, a keyboard device is provided. The keyboard device includes a keyboard module and a palm rest module. The palm rest module is arranged beside a lateral side of the keyboard module, and supports a wrist of a user. The palm rest module includes a pedestal, a casing and an adjusting element. The casing is disposed on the pedestal. The adjusting element is arranged between the pedestal and the casing. A position of the casing relative to the pedestal is adjustable through the adjusting element. In a first usage state, the casing is moved toward the keyboard module or moved away from the keyboard module through the adjusting element. In a second usage state, the casing is rotated about the adjusting element and relative to the keyboard module, so that an included angle is formed between the casing and the lateral side of the keyboard module.

In an embodiment, the palm rest module further includes at least one guiding track, and the at least one guiding track is installed on the pedestal. The adjusting element includes at least one guiding part. The at least one guiding part is disposed within the at least one guiding track. While the casing is moved toward the keyboard module or moved away from the keyboard module through the adjusting element, the at least one guiding part is guided by the at least one guiding track.

In an embodiment, the palm rest module further includes at least one positioning block, and the at least one positioning block is installed on the pedestal. Each positioning block includes plural positioning recesses. The adjusting element further includes at least one first positioning bulge. The first positioning bulge is inserted into one of the plural positioning recesses.

As the casing is moved away from the keyboard module through the adjusting element, the first positioning bulge is inserted into a first positioning recess of the plural positioning recesses. Consequently, the casing is positioned at a first location. As the casing is moved toward the keyboard module through the adjusting element, the first positioning bulge is inserted into a second positioning recess of the plural positioning recesses. Consequently, the casing is positioned at a second location.

In an embodiment, the casing includes an upper cover and a lower cover. The lower cover is arranged between the adjusting element and the upper cover. The upper cover includes a palm rest part.

In an embodiment, the palm rest module further includes at least one arc-shaped protrusion structure. The at least one arc-shaped protrusion structure is installed on the lower cover of the casing. The arc-shaped protrusion structure includes plural positioning recesses. The adjusting element further includes at least one arc-shaped positioning slot and at least one second positioning bulge. The at least one second positioning bulge is disposed within the corresponding arc-shaped positioning slot. The arc-shaped protrusion structure is embedded within the arc-shaped positioning slot. The second positioning bulge is inserted into one of the plural positioning recesses of the arc-shaped protrusion structure. While the casing is rotated about the adjusting element and relative to the pedestal, the arc-shaped protrusion structure is guided by the arc-shaped positioning slot.

While the casing is rotated about the adjusting element and relative to the pedestal and the included angle between the casing and the lateral side of the keyboard module is equal to a first angle, the second positioning bulge is inserted into a first positioning recess of the plural positioning recesses. Consequently, the casing is positioned at a first location. While the casing is rotated about the adjusting element and relative to the pedestal and the included angle between the casing and the lateral side of the keyboard module is equal to a second angle, the second positioning bulge is inserted into a second positioning recess of the plural positioning recesses. Consequently, the casing is positioned at a second location. The first angle and the second angle are different from each other.

In an embodiment, the palm rest module further includes at least one fastening element and at least one arc-shaped position-limiting slot. The at least one arc-shaped position-limiting slot runs through the lower cover the casing. The at least one arc-shaped position-limiting slot is located beside the arc-shaped protrusion structure. The arc-shaped position-limiting slot has a first stopping end and a second stopping end. The fastening element is penetrated through the arc-shaped position-limiting slot and tightened into the adjusting element. The arc-shaped protrusion structure has a positioning segment corresponding to the plural positioning recesses. The positioning segment has a first arc distance. The arc-shaped position-limiting slot has a second arc distance between the first stopping end and the second stopping end. The first arc distance and the second arc distance are equal.

While the casing is rotated about the adjusting element and relative to the pedestal and the fastening element is contacted with the first stopping end or the second stopping end of the corresponding arc-shaped position-limiting slot, the casing is not continuously rotated relative to the pedestal.

In accordance with an aspect of the present invention, a palm rest module for a keyboard module is provided. The palm rest module includes a pedestal, a casing and an adjusting element. The casing is disposed on the pedestal, and supports a wrist of a user. The adjusting element is arranged between the pedestal and the casing. A position of the casing relative to the pedestal is adjustable through the adjusting element. In a first usage state, the casing is moved toward the keyboard module or moved away from the keyboard module through the adjusting element. In a second usage state, the casing is rotated about the adjusting element and relative to the keyboard module. Consequently, an included angle is formed between the casing and the lateral side of the keyboard module.

From the above descriptions, the present invention provides a keyboard device. The keyboard device includes a keyboard module and a palm rest module. The palm rest module is arranged beside a lateral side of the keyboard module. The casing of the palm rest module is movable toward or away from the keyboard module through the adjusting element. Alternatively, the casing is rotatable about the adjusting element and relative to the keyboard module, so that an included angle is formed between the casing and the lateral side of the keyboard module. Due to this structural design, the relative position between the palm rest module and the keyboard module (e.g., the spacing interval adjustment or the angle adjustment) is adjustable according to the size of the user's palm. Since the wrists of different users can be certainly supported on the palm rest module, the user-friendliness and functionality of the keyboard device are enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
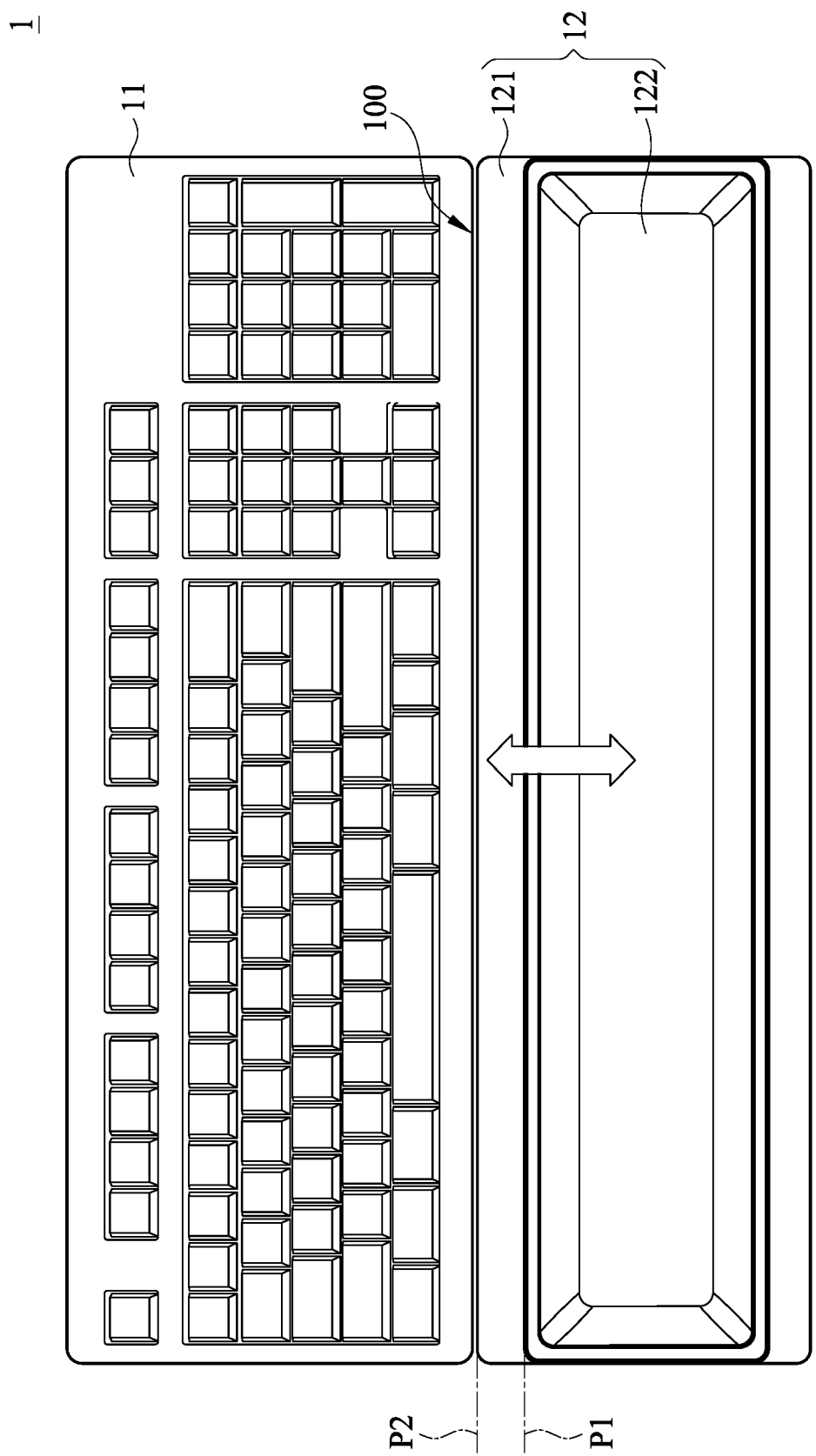
FIG. 1 is a schematic top view illustrating a keyboard device according to an embodiment of the present invention, in which the keyboard device is in a first usage state.
Figure 2:
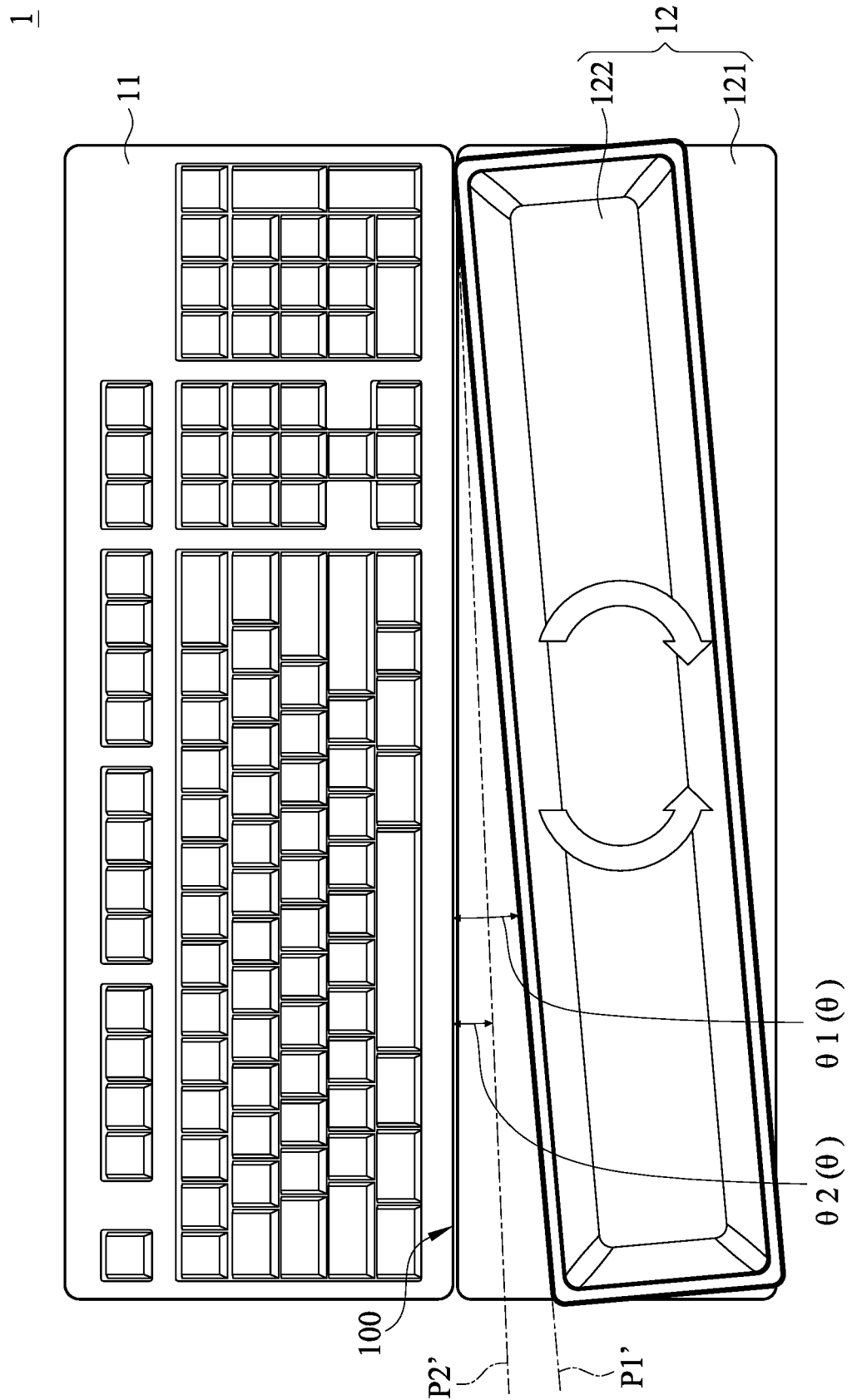
FIG. 2 is a schematic top view illustrating the keyboard device as shown in FIG. 1 and in a second usage state.
Figure 3:
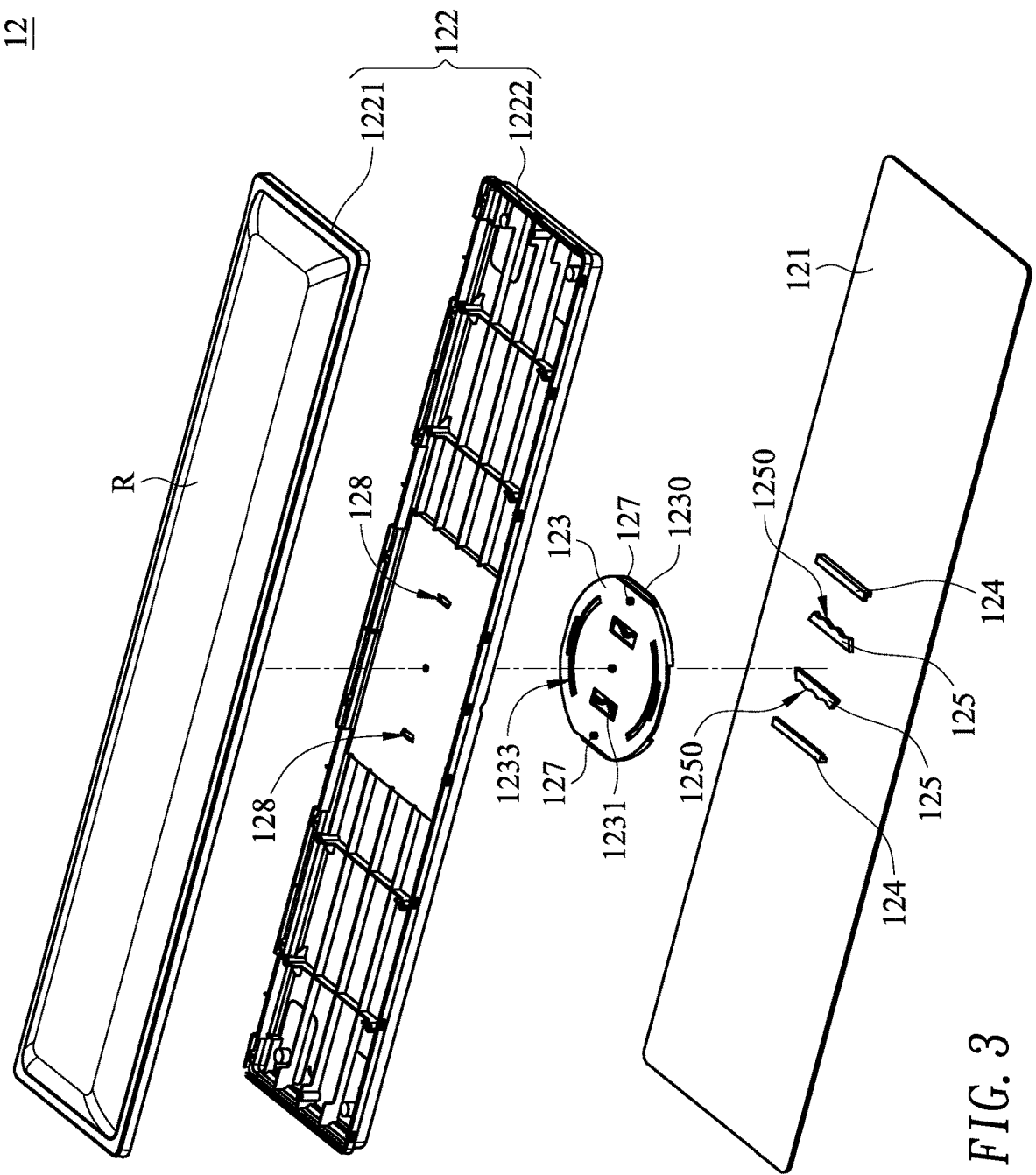
FIG. 3 is a schematic exploded view illustrating the palm rest module of the keyboard device as shown in FIG. 1.

Please refer to FIGS. 1, 2 and 3. FIG. 1 is a schematic top view illustrating a keyboard device according to an embodiment of the present invention, in which the keyboard device is in a first usage state. FIG. 2 is a schematic top view illustrating the keyboard device as shown in FIG. 1 and in a second usage state. FIG. 3 is a schematic exploded view illustrating the palm rest module of the keyboard device as shown in FIG. 1.

As shown in FIGS. 1 and 2, the keyboard device 1 comprises a keyboard module 11 and a palm rest module 12. The palm rest module 12 is arranged beside a lateral side 100 of the keyboard module 11. That is, the palm rest module 12 is arranged between the user (not shown) and the keyboard module 11. The palm rest module 12 is used for supporting the user's wrist. Consequently, when the keyboard module 11 is operated by the user, the unwell feel of the user's wrist is alleviated. In this embodiment, the keyboard module 11 and the palm rest module 12 are connected with each other through any appropriate connecting mechanism. That is, the example of the connecting mechanism is not restricted. In some other embodiments, the keyboard device is not equipped with the connecting mechanism. Under this circumstance, the palm rest module 12 is in direct contact with the lateral side 100 of the keyboard module 11.

Please refer to FIGS. 1, 2 and 3. In this embodiment, the palm rest module 12 comprises a pedestal 121, a casing 122 and an adjusting element 123. The casing 122 is disposed on the pedestal 121. The adjusting element 123 is arranged between the pedestal 121 and the casing 122. The position of the casing 122 relative to the pedestal 121 is adjustable through the adjusting element 123. When the keyboard device 1 is in a first usage state (see FIG. 1), the palm rest module 12 is movable relative to the keyboard module 11 linearly. The casing 122 of the palm rest module 12 is moved toward the keyboard module 11 or moved away from the keyboard module 11 through the adjusting element 123 (see FIG. 3). When the keyboard device 1 is in a second usage state (see FIG. 2), the palm rest module 12 is rotatable relative to the keyboard module 11. In this embodiment, the adjusting element 123 has a ring-shaped disc structure. While the casing 122 of the palm rest module 12 is rotated about the adjusting element 123 and relative to the keyboard module 11, an included angle θ is formed between the casing 122 of the palm rest module 12 and the lateral side 100 of the keyboard module 11.

The detailed structure and the operations of the palm rest module 12 will be described as follows.

Figure 4:
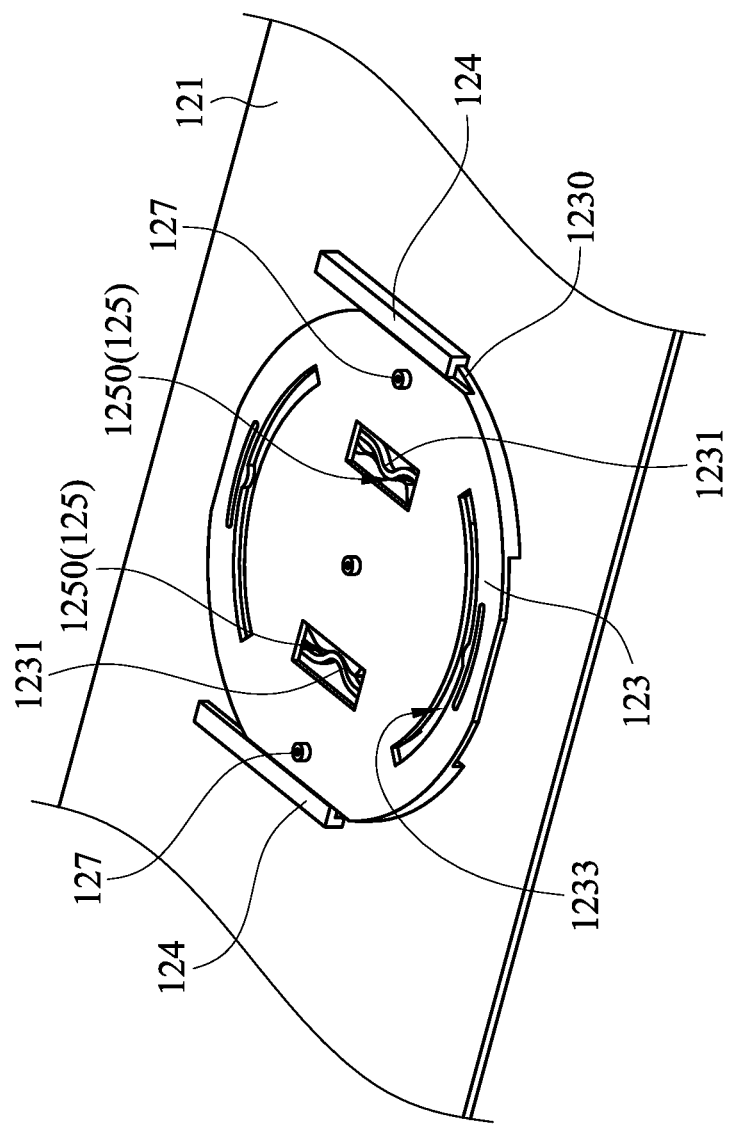
FIG. 4 is a schematic perspective view illustrating the connecting relationship between the pedestal and the adjusting element of the palm rest module as shown in FIG. 3.
Figure 5:
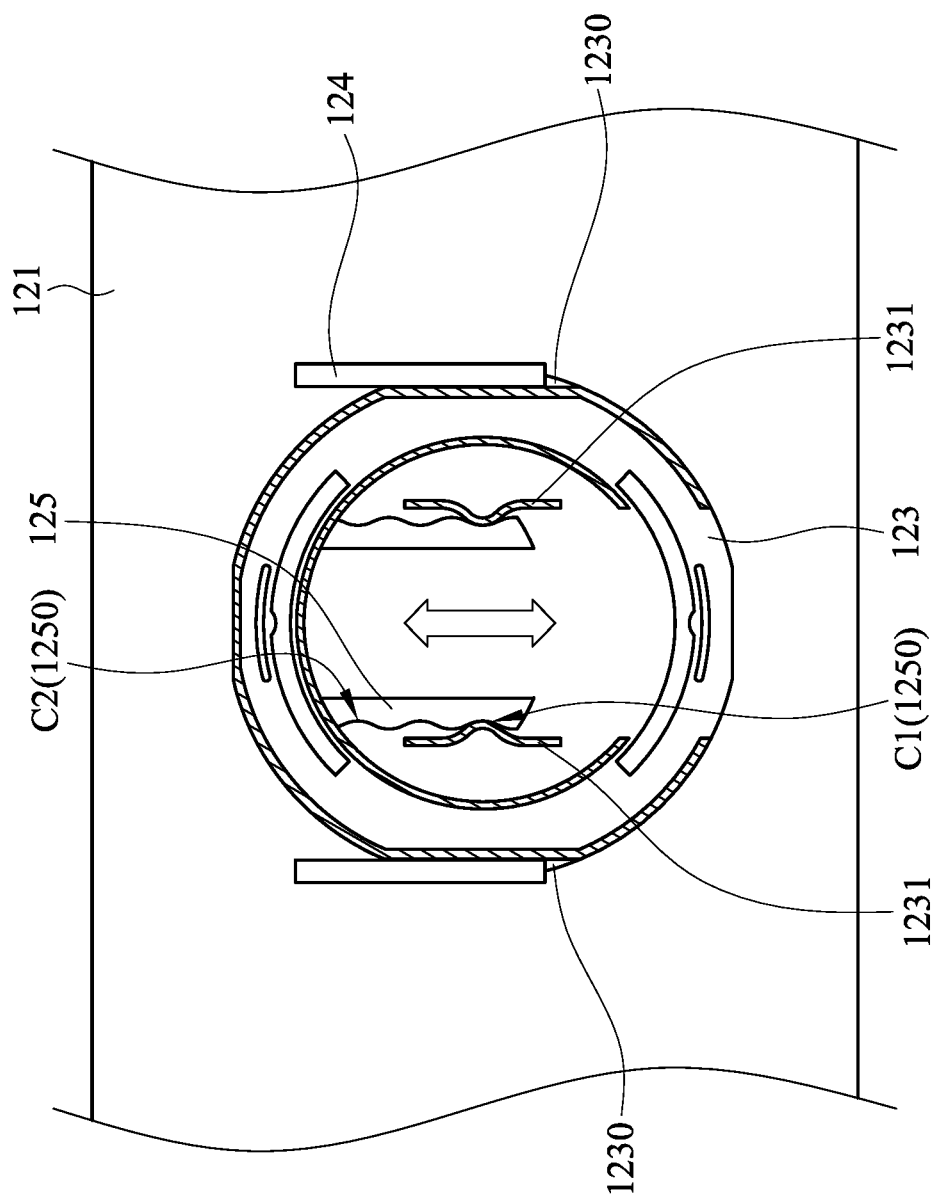
FIG. 5 is a schematic top view illustrating the operating relationship between the pedestal and the adjusting element of the palm rest module as shown in FIG. 3.

Please refer to FIGS. 1, 3, 4 and 5. FIG. 4 is a schematic perspective view illustrating the connecting relationship between the pedestal and the adjusting element of the palm rest module as shown in FIG. 3. FIG. 5 is a schematic top view illustrating the operating relationship between the pedestal and the adjusting element of the palm rest module as shown in FIG. 3. For succinctness, the casing 122 of the palm rest module 12 is not shown in FIGS. 4 and 5. In FIG. 4, the assembled structure of the pedestal 121 and the adjusting element 123 taken along the top view is shown. FIG. 5 is the cross-sectional view of the assembled structure of the pedestal 121 and the adjusting element 123 and taken along the horizontal cross section of the adjusting element 123. As shown in FIGS. 3, 4 and 5. In an embodiment, the palm rest module 12 further comprises at least one guiding track 124. For example, the palm rest module 12 comprises two guiding tracks 124. These two guiding tracks 124 are installed on a surface of the pedestal 122 which faces the adjusting element 123. The two guiding tracks 124 are opposed to each other. The adjusting element 123 comprises at least one guiding part 1230. For example, the adjusting element 123 comprises two guiding parts 1230. The two guiding parts 1230 are located at two opposite sides of the adjusting element 123. Moreover, the two guiding parts 1230 of the adjusting element 123 are disposed within the two guiding tracks 124, respectively. Consequently, the two guiding parts 1230 of the adjusting element 123 are arranged between the two guiding tracks 124. Especially, each guiding track 124 has an L-shaped groove, and each guiding part 1230 has a stepped structure matching the corresponding L-shaped groove. Consequently, each guiding part 1230 is embedded within the corresponding guiding track 124. While the keyboard device 1 is in the first usage state (see FIG. 1) and the casing 122 is moved toward the keyboard module 11 or moved away from the keyboard module 11 through the adjusting element 123, the two guiding parts 1230 are guided by the corresponding guiding tracks 124.

Please refer to FIGS. 1, 3, 4 and 5 again. In this embodiment, the palm rest module 12 further comprises at least one positioning block 125. For example, the palm rest module 12 comprises two positioning blocks 125. The two positioning blocks 125 are installed on the surface of the pedestal 122 which faces the adjusting element 123. The two positioning blocks 125 are opposed to each other, and arranged between the two guiding tracks 124. Each positioning block 125 comprises plural positioning recesses 1250. The adjusting element 123 further comprises at least one first positioning bulge 1231. For example, the adjusting element 123 comprises two first positioning bulges 1231. The two positioning blocks 125 are arranged between the two first positioning bulges 1231. The two first positioning bulges 1231 are aligned with the two positioning blocks 125. Moreover, each first positioning bulge 1231 is extended toward the corresponding positioning block 125, and each first positioning bulge 1231 is inserted into one of the plural positioning recesses 1250 of the corresponding positioning block 125. Please refer to FIG. 5. As the casing 122 of the palm rest module 12 is moved away from the keyboard module 11 through the adjusting element 123, each first positioning bulge 1231 of the adjusting element 123 is inserted into a first positioning recess C1 of the plural positioning recesses 1250 of the corresponding positioning block 125. Consequently, the casing 122 is positioned at a first location P1 relative to the keyboard module 11 (as FIG. 1). Whereas, as the casing 122 of the palm rest module 12 is moved toward the keyboard module 11 through the adjusting element 123, each first positioning bulge 1231 of the adjusting element 123 is inserted into a second positioning recess C2 of the plural positioning recesses 1250 of the corresponding positioning block 125. Consequently, the casing 122 is positioned at a second location P2 relative to the keyboard module 11 (as FIG. 1).

In the above embodiment, each positioning block 125 comprises three positioning recesses 1250. In other words, the casing 122 can be moved to three different locations relative to the keyboard module 11 through the adjusting element 123. It is noted that numerous modifications may be made while retaining the teachings of the present invention. For example, the number of the positioning recesses 1250 of each positioning block 125 may be increased or decreased according to the practical requirements.

Figure 6:
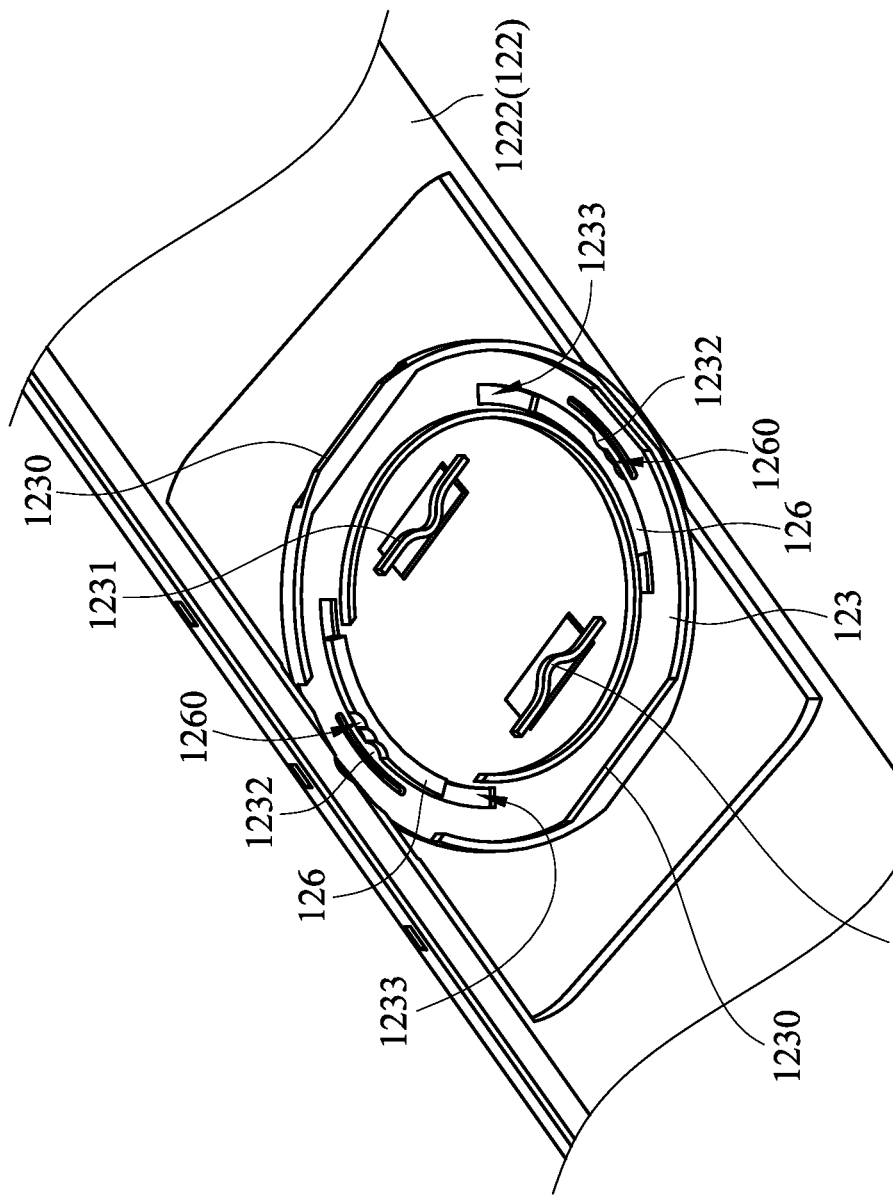
FIG. 6 is a schematic perspective view illustrating the connecting relationship between the casing and the adjusting element of the palm rest module as shown in FIG. 3.
Figure 7:
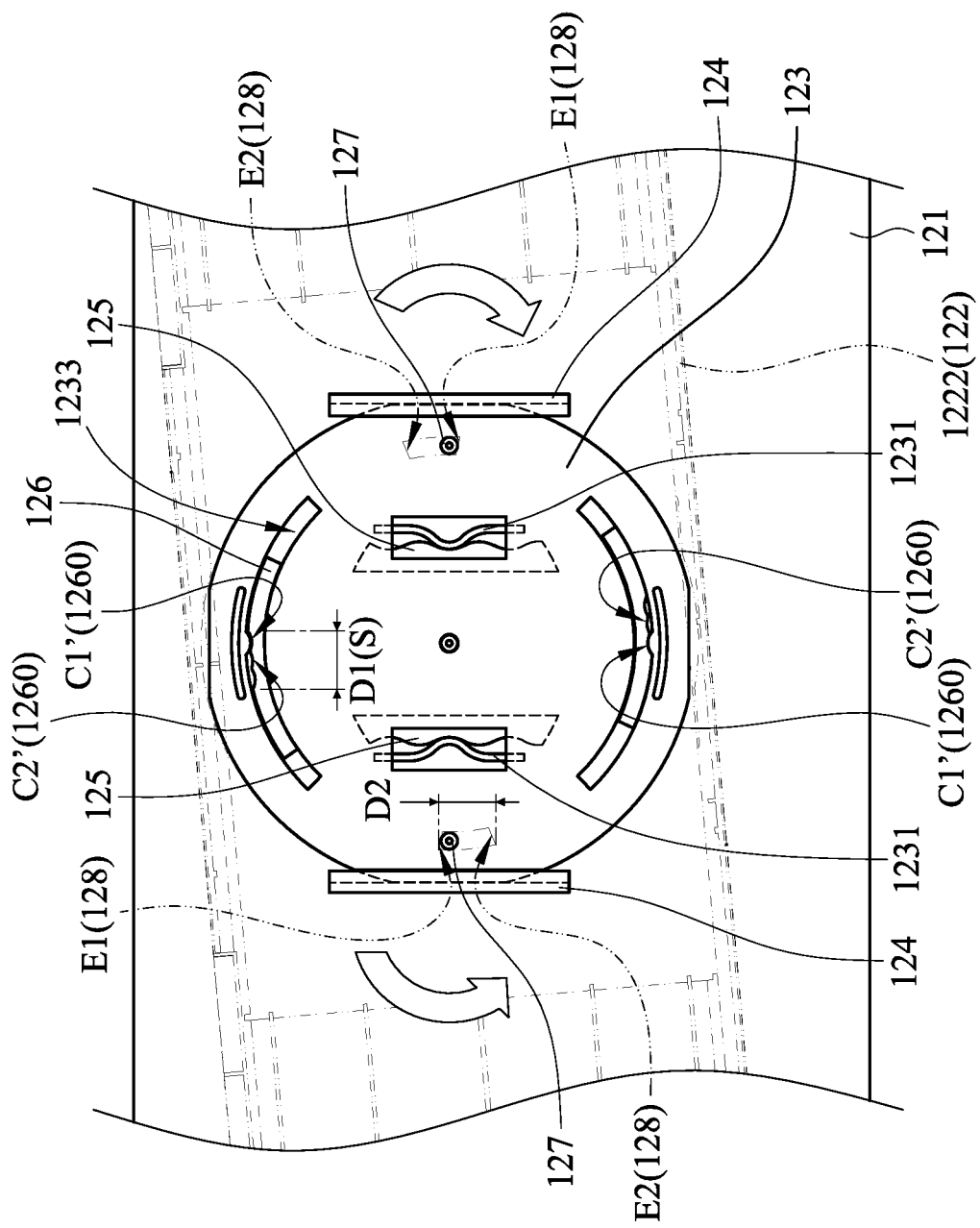
FIG. 7 is a schematic top view illustrating the operating relationship between the casing and the adjusting element of the palm rest module as shown in FIG. 3.

Please refer to FIGS. 2, 3, 6 and 7. FIG. 6 is a schematic perspective view illustrating the connecting relationship between the casing and the adjusting element of the palm rest module as shown in FIG. 3. FIG. 7 is a schematic top view illustrating the operating relationship between the casing and the adjusting element of the palm rest module as shown in FIG. 3. As shown in FIGS. 2 and 3, the casing 122 comprises an upper cover 1221 and a lower cover 1222. The lower cover 1222 is arranged between the adjusting element 123 and the upper cover 1221. The upper cover 1221 comprises a palm rest part R. That is, the wrist of the user is supported on the upper cover 1221 of the casing 122. Please refer to FIGS. 6 and 7. For succinctness, the upper cover 1221 and the pedestal 121 of FIG. 3 are not shown in FIG. 6. FIG. 6 is a schematic bottom view illustrating the assembled structure of the adjusting element 123 and the lower cover 1222 as shown in FIG. 3. The upper cover 1221 of FIG. 3 is not shown in FIG. 7. FIG. 7 is a schematic top view illustrating the assembled structure of the lower cover 1222, the adjusting element 123 and the pedestal 122 as shown in FIG. 3. In this embodiment, the palm rest module 12 further comprises at least one arc-shaped protrusion structure 126. For example, the palm rest module 12 comprises two arc-shaped protrusion structures 126. The two arc-shaped protrusion structures 126 are installed on a surface of the lower cover 1222 of the casing 122 the faces the adjusting element 123. The two arc-shaped protrusion structures 126 are opposed to each other. Each arc-shaped protrusion structure 126 comprises plural positioning recesses 1260. The adjusting element 123 further comprises at least one arc-shaped positioning slot 1233 and at least one second positioning bulge 1232. The at least one second positioning bulge 1232 is disposed within the corresponding arc-shaped positioning slot 1233. In this embodiment, the adjusting element 123 comprises two arc-shaped positioning slots 1233 and two second positioning bulges 1232. The two arc-shaped protrusion structures 126 are embedded within the two corresponding arc-shaped positioning slots 1233. The two second positioning bulges 1232 are aligned with the two arc-shaped protrusion structures 126, respectively. Each second positioning bulge 1232 is extended toward the corresponding arc-shaped protrusion structure 126. Consequently, each second positioning bulge 1232 is inserted into one of the plural positioning recesses 1260 of the corresponding arc-shaped protrusion structure 126. While the casing 122 is rotated about the adjusting element 123 and relative to the pedestal 121, the two arc-shaped protrusion structures 126 are guided by the two corresponding arc-shaped positioning slots 1233.

Please refer FIG. 7. While the casing 122 is rotated about the adjusting element 123 and relative to the pedestal 121 and the included angle θ between the casing 122 of the palm rest module 12 and the lateral side 100 of the keyboard module 11 is equal to a first angle θ1, each second positioning bulge 1232 of the adjusting element 123 is inserted into a first positioning recess C1' of the plural positioning recesses 1260 of the corresponding arc-shaped protrusion structure 126. Consequently, the casing 122 is positioned at a first location P1' relative to the keyboard module 11 (as FIG. 2). While the casing 122 is rotated about the adjusting element 123 and relative to the pedestal 121 and the included angle θ between the casing 122 of the palm rest module 12 and the lateral side 100 of the keyboard module 11 is equal to a second angle θ2, each second positioning bulge 1232 of the adjusting element 123 is inserted into a second positioning recess C2' of the plural positioning recesses 1260 of the corresponding arc-shaped protrusion structure 126. Consequently, the casing 122 is positioned at a second location P2' relative to the keyboard module 11 (as FIG. 2). In this embodiment, the first angle θ1 is larger than the second angle θ2.

In the above embodiment, each arc-shaped protrusion structure 126 comprises three positioning recesses 1260. In other words, the casing 122 can be rotated to three different locations relative to the keyboard module 11 through the adjusting element 123. It is noted that numerous modifications may be made while retaining the teachings of the present invention. For example, the number of the positioning recesses 1260 of each arc-shaped protrusion structure 126 may be increased or decreased according to the practical requirements.

Please refer to FIGS. 3 and 7. In this embodiment, the palm rest module 12 further comprises at least one fastening element 127 and at least one arc-shaped position-limiting slot 128. For example, the palm rest module 12 comprises two fastening elements 127 and two arc-shaped position-limiting slots 128. The two arc-shaped position-limiting slots 128 run through the lower cover 1222 of the casing 122. The two arc-shaped position-limiting slots 128 are arranged between the two arc-shaped protrusion structures 126. Each arc-shaped position-limiting slot 128 has a first stopping end E1 and a second stopping end E2. The two fastening elements 127 are respectively penetrated through the two arc-shaped position-limiting slots 128 and tightened into the adjusting element 123. The arc-shaped position-limiting slots 128 are used for limiting the rotatable range of the casing 122 relative to the pedestal 121. Moreover, each arc-shaped protrusion structure 126 has a positioning segment S corresponding to the positioning recesses 1260. The positioning segment S has a first arc distance D1. Each arc-shaped position-limiting slot 128 has a second arc distance D2 between the first stopping end E1 and the second stopping end E2. The first arc distance D1 and the second arc distance D2 are equal. This structural design provides the following function. While the casing 122 is rotated about the adjusting element 123 and relative to the pedestal 121 and the fastening element 127 is contacted with the first stopping end E1 or the second stopping end E of the corresponding arc-shaped position-limiting slot 128, the casing 122 cannot be continuously rotated relative to the pedestal 121.

From the above descriptions, the present invention provides a keyboard device. The keyboard device includes a keyboard module and a palm rest module. The palm rest module is arranged beside a lateral side of the keyboard module. The casing of the palm rest module is movable toward or away from the keyboard module through the adjusting element. Alternatively, the casing is rotatable about the adjusting element and relative to the keyboard module, so that an included angle is formed between the casing and the lateral side of the keyboard module. Due to this structural design, the relative position between the palm rest module and the keyboard module (e.g., the spacing interval adjustment or the angle adjustment) is adjustable according to the size of the user's palm. Since the wrists of different users can be certainly supported on the palm rest module, the user-friendliness and functionality of the keyboard device are enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard device, comprising:
   a keyboard module; and
   a palm rest module arranged beside a lateral side of the keyboard module, and configured to support a wrist of a user, wherein the palm rest module comprises a pedestal, a casing and an adjusting element, wherein the casing is disposed on the pedestal, the adjusting element is arranged between the pedestal and the casing, and a position of the casing relative to the pedestal is adjustable through the adjusting element,
   wherein in a first usage state, the casing is moved toward the keyboard module or moved away from the keyboard module through the adjusting element, wherein in a second usage state, the casing is rotated about the adjusting element and relative to the keyboard module, so that an included angle is formed between the casing and the lateral side of the keyboard module,
   wherein the palm rest module further comprises at least one positioning block, and the at least one positioning block is installed on the pedestal, wherein the at least one positioning block comprises plural positioning recesses, the adjusting element further comprises at least one first positioning bulge, and the at least one first positioning bulge is inserted into one of the plural positioning recesses.

2. The keyboard device according to claim 1, wherein the palm rest module further comprises at least one guiding track, and the at least one guiding track is installed on the pedestal, wherein the adjusting element comprises at least one guiding part, and the at least one guiding part is disposed within the at least one guiding track, wherein while the casing is moved toward the keyboard module or moved away from the keyboard module through the adjusting element, the at least one guiding part is guided by the at least one guiding track.

3. The keyboard device according to claim 1, wherein as the casing is moved away from the keyboard module through the adjusting element, the at least one first positioning bulge is inserted into a first positioning recess of the plural positioning recesses, so that the casing is positioned at a first location, wherein as the casing is moved toward the keyboard module through the adjusting element, the at least one first positioning bulge is inserted into a second positioning recess of the plural positioning recesses, so that the casing is positioned at a second location.

4. The keyboard device according to claim 1, wherein the casing comprises an upper cover and a lower cover, wherein the lower cover is arranged between the adjusting element and the upper cover, and the upper cover comprises a palm rest part.

5. The keyboard device according to claim 4, wherein the palm rest module further comprises at least one arc-shaped protrusion structure, and the at least one arc-shaped protrusion structure is installed on the lower cover of the casing, wherein the at least one arc-shaped protrusion structure comprises second plural positioning recesses, the adjusting element further comprises at least one arc-shaped positioning slot and at least one second positioning bulge, the at least one second positioning bulge is disposed within a corresponding at least one arc-shaped positioning slot, the at least one arc-shaped protrusion structure is embedded within the at least one arc-shaped positioning slot, and the at least one second positioning bulge is inserted into one of the second plural positioning recesses of the at least one arc-shaped protrusion structure, wherein while the casing is rotated about the adjusting element and relative to the pedestal, the at least one arc-shaped protrusion structure is guided by the at least one arc-shaped positioning slot.

6. The keyboard device according to claim 5, wherein while the casing is rotated about the adjusting element and relative to the pedestal and the included angle between the casing and the lateral side of the keyboard module is equal to a first angle, the at least one second positioning bulge is inserted into a first positioning recess of the second plural positioning recesses, so that the casing is positioned at a first location, wherein while the casing is rotated about the adjusting element and relative to the pedestal and the included angle between the casing and the lateral side of the keyboard module is equal to a second angle, the at least one second positioning bulge is inserted into a second positioning recess of the sec, second plural positioning recesses, so that the casing is positioned at a second location, wherein the first angle and the second angle are different from each other.

7. The keyboard device according to claim 5, wherein the palm rest module further comprises at least one fastening element and at least one arc-shaped position-limiting slot, wherein the at least one arc-shaped position-limiting slot runs through the lower cover the casing, the at least one arc-shaped position-limiting slot is located beside the at least one arc-shaped protrusion structure, the at least one arc-shaped position-limiting slot has a first stopping end and a second stopping end, and the fastening element is penetrated through the at least one arc-shaped position-limiting slot and tightened into the adjusting element, wherein the at least one arc-shaped protrusion structure has a positioning segment corresponding to the second plural positioning recesses, the positioning segment has a first arc distance, the at least one arc-shaped position-limiting slot has a second arc distance between the first stopping end and the second stopping end, and the first arc distance and the second arc distance are equal.

8. The keyboard device according to claim 7, wherein while the casing is rotated about the adjusting element and relative to the pedestal and the fastening element is contacted with the first stopping end or the second stopping end of a corresponding at least one arc-shaped position-limiting slot, the casing is not continuously rotated relative to the pedestal.

9. A palm rest module for a keyboard module configured to support a wrist of a user, the palm rest module comprising:
a pedestal;
a casing disposed on the pedestal, and configured to support the wrist of a user;
an adjusting element arranged between the pedestal and the casing, wherein a position of the casing relative to the pedestal is adjustable through the adjusting element; and
at least one positioning block, and the at least one positioning block is installed on the pedestal, wherein the at least one positioning block comprises plural positioning recesses, the adjusting element further comprises at least one first positioning bulge, and the at least one first positioning bulge is inserted into one of the plural positioning recesses,
wherein in a first usage state, the casing is moved toward the keyboard module or moved away from the keyboard module through the adjusting element, wherein in a second usage state, the casing is rotated about the adjusting element and relative to the keyboard module, so that an included angle is formed between the casing and the lateral side of the keyboard module.

10. The palm rest module according to claim 9, wherein the palm rest module further comprises at least one guiding track, and the at least one guiding track is installed on the pedestal, wherein the adjusting element comprises at least one guiding part, and the at least one guiding part is disposed within the at least one guiding track, wherein while the casing is moved toward the keyboard module or moved away from the keyboard module through the adjusting element, the at least one guiding part is guided by the at least one guiding track.

11. The palm rest module according to claim 9, wherein as the casing is moved away from the keyboard module through the adjusting element, the at least one first positioning bulge is inserted into a first positioning recess of the plural positioning recesses, so that the casing is positioned at a first location, wherein as the casing is moved toward the keyboard module through the adjusting element, the at least one first positioning bulge is inserted into a second positioning recess of the plural positioning recesses, so that the casing is positioned at a second location.

12. The palm rest module according to claim 9, wherein the casing comprises an upper cover and a lower cover, wherein the lower cover is arranged between the adjusting element and the upper cover, and the upper cover comprises a palm rest part.

13. The palm rest module according to claim 12, wherein the palm rest module further comprises at least one arc-shaped protrusion structure, and the at least one arc-shaped protrusion structure is installed on the lower cover of the casing, wherein the at least one arc-shaped protrusion structure comprises second plural positioning recesses, the adjusting element further comprises at least one arc-shaped positioning slot and at least one second positioning bulge, the at least one second positioning bulge is disposed within a corresponding at least one arc-shaped positioning slot, the at least one arc-shaped protrusion structure is embedded within the at least one arc-shaped positioning slot, and the at least one second positioning bulge is inserted into one of the second plural positioning recesses of the at least one arc-shaped protrusion structure, wherein while the casing is rotated about the adjusting element and relative to the pedestal, the at least one arc-shaped protrusion structure is guided by the at least one arc-shaped positioning slot.

14. The palm rest module according to claim 13, wherein while the casing is rotated about the adjusting element and relative to the pedestal and the included angle between the casing and the lateral side of the keyboard module is equal to a first angle, the at least one second positioning bulge is inserted into a first positioning recess of the second plural positioning recesses, so that the casing is positioned at a first location, wherein while the casing is rotated about the adjusting element and relative to the pedestal and the included angle between the casing and the lateral side of the keyboard module is equal to a second angle, the at least one second positioning bulge is inserted into a second positioning recess of the second plural positioning recesses, so that the casing is positioned at a second location, wherein the first angle and the second angle are different from each other.

15. The keyboard device according to claim 13, wherein the palm rest module further comprises at least one fastening element and at least one arc-shaped position-limiting slot, wherein the at least one arc-shaped position-limiting slot runs through the lower cover the casing, the at least one arc-shaped position-limiting slot is located beside the at least one arc-shaped protrusion structure, the at least one arc-shaped position-limiting slot has a first stopping end and a second stopping end, and the fastening element is penetrated through the at least one arc-shaped position-limiting slot and tightened into the adjusting element, wherein the at least one arc-shaped protrusion structure has a positioning segment corresponding to the second plural positioning recesses, the positioning segment has a first arc distance, the at least one arc-shaped position-limiting slot has a second arc distance between the first stopping end and the second stopping end, and the first arc distance and the second arc distance are equal.

16. The keyboard device according to claim 15, wherein while the casing is rotated about the adjusting element and relative to the pedestal and the fastening element is contacted with the first stopping end or the second stopping end of a corresponding at least one arc-shaped position-limiting slot, the casing is not continuously rotated relative to the pedestal.

* * * * *